United States Patent [19]

Schumacher et al.

[11] 4,140,436
[45] Feb. 20, 1979

[54] PRESSURE CONTROL DEVICE FOR FLUID SYSTEMS

[75] Inventors: Ernest W. Schumacher, DeSoto; Hisashi Ebisawa, Duncanville, both of Tex.

[73] Assignee: Virginia Chemicals Inc., Portsmouth, Va.

[21] Appl. No.: 826,078

[22] Filed: Aug. 19, 1977

[51] Int. Cl.² .................. F04B 49/02; F04B 49/08
[52] U.S. Cl. ..................................... 417/27; 137/508; 200/83 Q; 417/28; 417/311; 417/440
[58] Field of Search ............. 200/83 Q; 137/508, 510; 417/26–28, 440, 307–311, 280

[56] References Cited

U.S. PATENT DOCUMENTS

| | | | |
|---|---|---|---|
| 1,938,327 | 12/1933 | Green | 200/83 Q |
| 2,888,947 | 6/1959 | Montgomery et al. | 137/510X |
| 3,164,414 | 1/1965 | Stelzer | 200/83 Q |
| 3,258,029 | 6/1966 | Parrino | 137/508 |
| 3,446,238 | 5/1969 | Norstrud et al. | 417/28 X |
| 3,859,484 | 1/1975 | Nelson | 200/83 Q |
| 3,973,877 | 8/1976 | Taki | 417/38 |

Primary Examiner—Carlton R. Croyle
Assistant Examiner—Edward Look
Attorney, Agent, or Firm—Depaoli & O'Brien

[57] ABSTRACT

A device is provided for monitoring and controlling the above-ambient pressure in a system by comparing a net pressure force, produced by the system pressure on a pair of diaphragms having unequal areas, with a net spring force produced by a pair of opposed springs which clamp together a valve member and a valve seat in a pressure-relief member. The valve seat is connected by a passage to a port which is connected to the system pressure. While thus clamped together, the valve member and the pressure-relief member travel together through most of the total stroke created by movement of the pair of diaphragms and activate a microswitch for admitting additional fluid to the system when the system pressure is insufficient. If the net pressure force is sufficiently greater than the net spring force because of excessive system pressure, a port is opened when the valve strikes a stop and the pressure-relief member continues to move. The device is suitable for systems at below-ambient pressures by reversing the inequality of the diaphragms.

29 Claims, 10 Drawing Figures

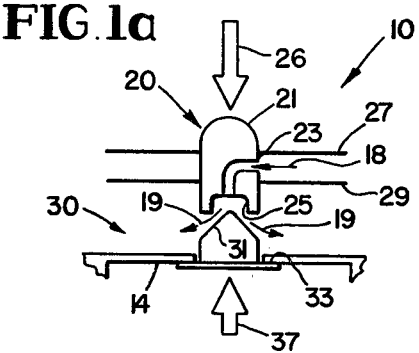
FIG. 1a
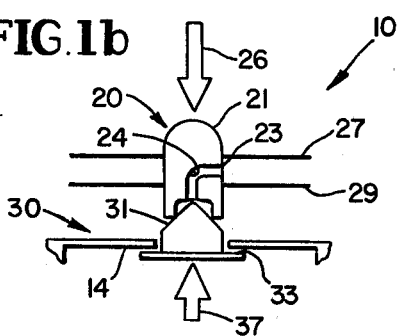
FIG. 1b
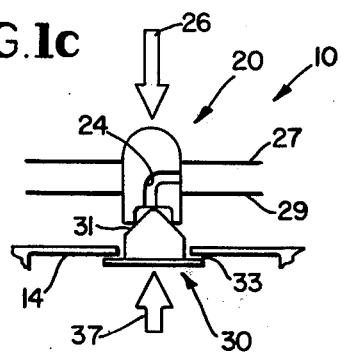
FIG. 1c
FIG. 2
SEPARATOR ASSEMBLY 20 OPENS PORT 25 WHILE PIN ASSEMBLY 30 IS RESTRAINED BY SHOULDER 14
PRESSURE CONTROL DEVICE 10 IS IN NEUTRAL POSITION WHILE PORT 25 REMAINS CLOSED AND SWITCH 17 IS NOT ACTIVATED
PRESSURE CONTROL DEVICE 10 ACTIVATES MICROSWITCH 17 WHILE PORT 25 REMAINS CLOSED
TOTAL STROKE

PRESSURE CONTROL DEVICE FOR FLUID SYSTEMS

BACKGROUND OF THE INVENTION

1. Field of the Invention

This invention relates to pressure control devices for fluids and more particularly relates to devices for maintaining a selected pressure in air compressing systems and specifically relates to such pressure-maintaining devices in refrigeration and air conditioning systems in which air is the working medium.

2. Review of the Prior Art

There are many fields in which a selected pressure must be maintained by a regulating device. For example, U.S. Pat. No. 3,604,452 describes a device for regulating the flow of natural gas from a supply line; U.S. Pat. No. 3,083,546 describes a two-fluid system employing a pair of opposing diaphragms of unequal area in an aircraft anti-ice control system; and U.S. Pat. No. 3,974,752 teaches a combination of a pair of springs and a pair of opposed diaphragms of unequal areas which are acted upon by aircraft cabin pressure and by comparative pressure within a memory chamber.

None of these devices, however, combines a comparison means with a pressure-relieving means and a pressure-increasing means that operates to regulate pressure within a system without dumping fluid therefrom while admitting additional fluid.

Such a pressure-control device is especially needed for a rotary-vane air cycle system for air-conditioning automobiles and either cooling a building as an air conditioner or heating a building as a heat pump. In such a device, air as the working fluid is compressed in a rotary-vane air compressor to a pressure of one to nine atmospheres and a temperature of 150°–200° F. or more, cooled in a heat exchanger to a temperature of about 10° F. above ambient, re-introduced into the compressor, expanded therein to a much lower temperature, and heat exchanged or otherwise used for air conditioning and cooling purposes.

A rotary-vane air compressor that has been described in popular literature is disclosed in the following U.S. Pat. Nos. 3,686,893; 3,877,245; 3,884,664; 3,886,763; 3,886,764; 3,886,765; 3,904,327; 3,956,904; 3,967,466; 3,968,649; 3,974,752; and 3,977,852. This device and its utility was described, for example, in "Sensational New Auto Air Conditioner: It Cools Without Refrigerant," by E. F. Lindsey, *Popular Science*, 54, December 1970, pages 54 and 55, and in "Rovac — Now It Can Heat and Cool Your House," by E. F. Lindsey, *Popular Science*, August 1976, 84–87, 119.

Control of the pressure entering such a rotary-vane air compressor is a very satisfactory way to control the expander exit temperature and the system capacity, but achieving such control to the degree of precision that is needed is not a simple matter. Satisfactory control devices do exist for large air conditioning and compressing systems in which air is the working fluid, such as the cabins of large aircraft. Smaller units having the compactness, economy of manufacture, precision of control, long working life, and sensitive response characteristics that are needed for air conditioning purposes, especially in automobiles, are not to be found at the present time.

SUMMARY OF THE INVENTION

Accordingly, an air-control device is herein provided that is useful as a pressure-controller or regulator for controlling the pressure of a fluid, either gaseous or liquid, within a system which may be either a dynamic system or a static system. A dynamic system is typically an air conditioner for an automobile or a building, a heat pump for a building, a natural gas distribution system, a pipeline for petroleum products, or a hydrogen make-up line to a hydrocracking operation in a fluidized catalytic cracking tower; a static system is typically an aircraft cabin, a hyperbaric treatment chamber for a patient receiving oxygen, a diver's pressure chamber, or a brake system, either hydraulic or air, in a moving vehicle. This device can be used to supply additional fluid to the system from a reservoir maintained at a pressure higher than the selected pressure, or it can be used to start a compressor or pump to increase the pressure of the fluid within the system. It operates in parallel to the system, not in series, and is thus not a flow-through device.

Unless there is a leak in the system being regulated or an operator or a mechanical control means changes the selected pressure within the system, the control device of this invention may remain in its neutral state indefinitely. If pressure in the system must be decreased, the device opens an outlet or a bleed port; if pressure in the system must be increased, the device increases the pressure by admitting more fluid or by compressing the existing fluid.

The device has a pressure-relief member which is sealably attached to a pair of spaced-apart diaphragms and comprises a port which is between the diaphragms, a valve seat which is outside of the diaphragms, and a passage between the port and the valve seat. The device also has a movable valve member which seats sealably into the valve seat and is clamped thereinto by a pair of opposed springs, one spring being adjustable.

The device operates by creating a resultant or net force from the pair of diaphragms which are disposed in parallel and which form, in combination with a housing, a pressure chamber in fluid communication with the system being monitored. The net force is opposed by the adjustable spring. The pressure relief member is supported entirely by the pair of diaphragms. While the valve is clamped against and into the valve seat, the pressure relief member and the valve travel together, transversely to the diaphragms, over a portion of the total stroke provided by the diaphragms.

When the pressure in the system is higher than a selected pressure, the travel direction is with the net force and against the adjustable spring until a shoulder on the valve contacts and is stopped by a shoulder on the housing, so that the valve ceases to move and the pressure relief member continues to travel until it creates a relief port between the valve seat and the valve.

When the pressure is less than the selected pressure, the pressure relief member and the valve travel together in the opposite direction until a switch means is contacted for admitting additional fluid into the system or for pressurizing the system in another way.

When the system pressure is essentially the same as the selected pressure, the pressure relief member and the valve remain clamped together by the opposed springs and suspended by the pair of diaphragms which may be of rubber or metal, depending upon the pressure gradient that is desired.

For a system to be monitored and maintained at an above-ambient pressure, the device can be analyzed as operating by comparing a net pressure force, produced by the system pressure on a pair of diaphragms having unequal areas, with a net spring force produced by a pair of opposed springs which clamp together a valve member and a valve seat in a pressure-relief member. The valve seat is connected by a passage to a port which is connected to the system pressure. While thus clamped together, the valve member and the pressure-relief member travel together through a portion of the total stroke created by movement of the pair of diaphragms and activate a microswitch for admitting additional fluid to the system when the system pressure is insufficient. If the net pressure force is sufficiently greater than the net spring force because of excessive system pressure, a port is opened when the valve strikes a stop and the pressure-relief member continues to move.

This air pressure control device may be analyzed as a balance of forces acting in opposite directions. The result of such balance is that a leverage is created that effectively minimizes the unit stresses to be placed on the springs used as each biasing means. Using the following symbols, as an example:

$P_A$ = atmospheric pressure, psia
$P_S$ = system pressure, psia
$F_{B_1}$ = force created by the biasing means acting to move the valve seat
$F_{B_2}$ = force created by the biasing means acting to move the valve
$A_1$ = area of larger diaphragm, in$^2$
$A_2$ = area of smaller diaphragm, in$^2$ = $0.8A_1$

BALANCE OF FORCES $A_1P_A + F_{B_1} + A_2P_S = A_2P_A + F_{B_2} + A_1P_S$
$A_1P_A + F_{B_1} + 0.8A_1P_S = 0.8A_1P_A + F_{B_2} + A_1P_S$
$0.2A_1P_A + F_{B_1} = 0.2A_1P_S + F_{B_2}$
$0.2A_1P_A + F_{B_1} - F_{B_2} = 0.2A_1P_S$
$F_{B_1} - F_{B_2} = 0.2A_1P_S - 0.2A_1P_A$
$F_{B_1} - F_{B_2} = 0.2A_1(P_S - P_A)$

Without the double-diaphragm separator assembly of this invention for minimizing pressures, the valve seat spring would have to overcome the full force of the system pressure or, for this example, five times as great a force.

The device is suitable for systems at below-ambient pressures by reversing the inequality of the diaphragms, i.e., by placing the larger diaphragm on the bottom or valve side. However, much of the benefit imparted by the suspended double-diaphragm concept of this invention would not occur in a vacuum system because the required spring loads would naturally be much lower in order to obtain set points throughout the vacuum range.

BRIEF DESCRIPTION OF THE DRAWINGS

FIG. 1a is a schematic sectional elevation of the pressure control device of this invention in its pressure-reducing position for a system at a pressure higher than ambient.

FIG. 1b shows the device of FIG. 1a in its neutral position.

FIG. 1c shows the device in its pressure-increasing position.

FIG. 2 is a diagrammatic representation of the portions of the total stroke that are represented by FIGS. 1a, 1b, and 1c, not drawn to scale.

BRIEF DESCRIPTION OF THE PREFERRED EMBODIMENTS

Figure 3:
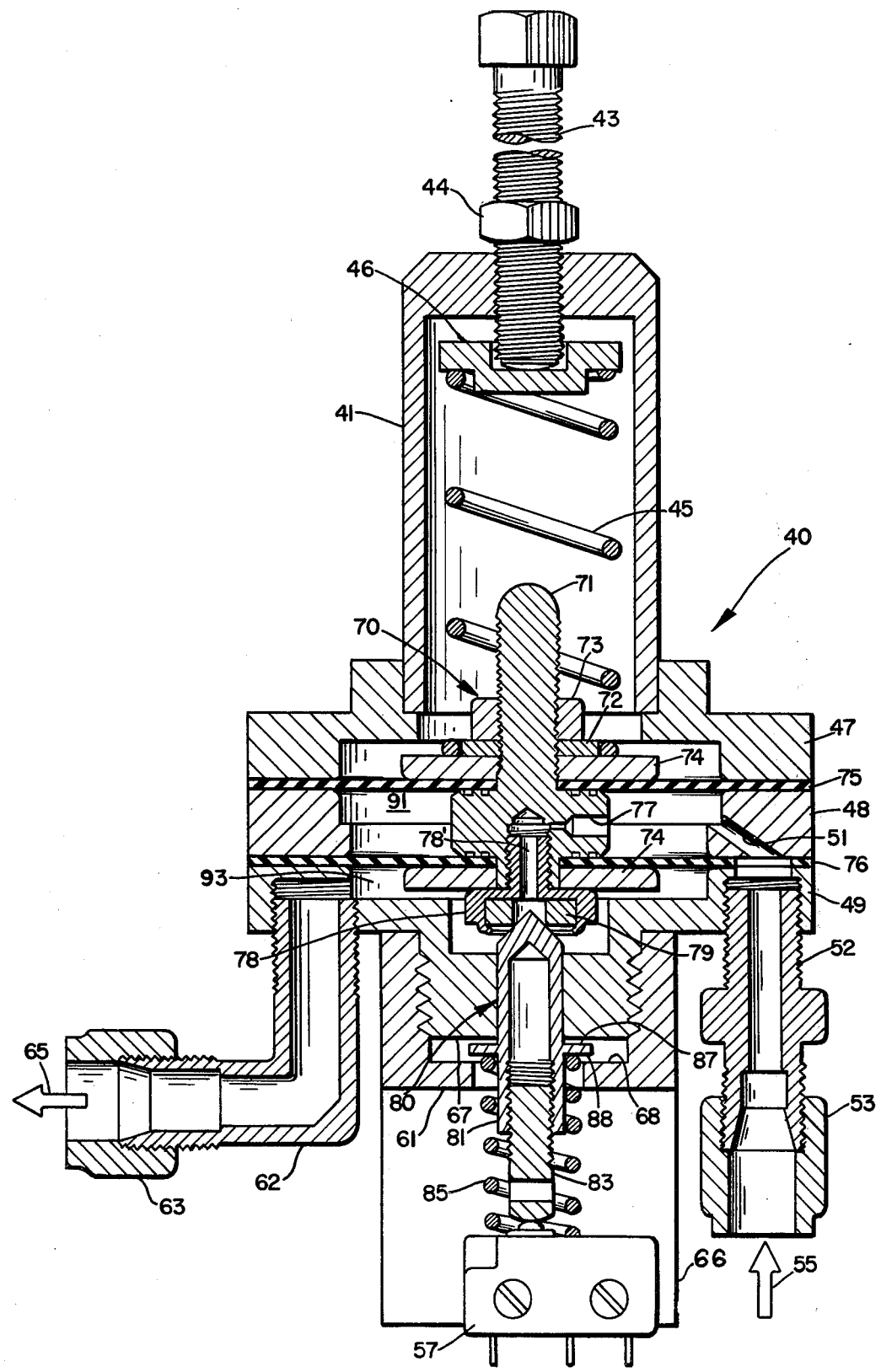
FIG. 3 is a sectional elevation of one embodiment of the device having a knob adjustment for a system at a pressure higher than ambient.

Referring particularly to FIGS. 1a, 1b, and 1c, the pressure-control device 10 of this invention, for a system under a pressure greater than ambient, comprises a double-diaphragm assembly 20, a pin assembly 30, and a travel interruption means, such as stop shoulder 14 and pin shoulder 33. More specifically, the double-diaphragm assembly 20 comprises a diaphragm separator 21, an inlet port 23, a valve seat 25 which is connected to inlet port 23 by an internal passage 24, a biasing means 26, a larger diaphragm 27, and a smaller diaphragm 29. The pair of diaphragms 27, 29 are spaced apart to form opposing sides of a pressure chamber and are sealably attached to the diaphragm separator 21, with the inlet port 23 being located therebetween.

Diaphragm 27 is selectively larger than diaphragm 29 so as to maintain a force differential or net force that is in proportion to the total pressure of the system that is being measured. When operating with air-conditioning systems having air as the working fluid and in which the operating pressure varies between 1 and 9 atmospheres, the pressure differential normally varies from 3 to 8 psi, the higher pressure differentials being needed for higher pressures. In such air conditioning systems having air as the working fluid, the total stroke, as shown in FIG. 2, is about 0.020 inch, divided between port opening portion 11, neutral portion 13, and microswitch opening portion 15 of the total stroke.

The pin assembly 30 comprises a pin or valve 31, having a conical shoulder which fits sealably into the valve seat 25, and a biasing means 37 for seating the valve 31. The biasing means 26 operates oppositely to the biasing means 37, thus compressing the double-diaphragm assembly 20 against the pin assembly 30 and more specifically compressing the conical shoulder of valve 31 into the valve seat 25. Consequently the double-diaphragm assembly 20 and the pin assembly 30 move together as a single object in an axial direction.

When such movement is in the travel direction indicated in FIG. 2 for the port opening portion 11 of the total stroke, while moving against the biasing means 26, it continues until shoulder 14 is struck by shoulder 33. Then the double-diaphragm assembly 20 moves alone, opening a gap between valve seat 25 and valve 31 to create an opening or outlet port through which flow 18 to inlet port 23 is able to move through inner passage 24 to the outlet port and thence to ambient pressure as outflow 19.

In the two lower portions of FIG. 2, the assembly 20 and the assembly 30 are bound by the biasing means 26, 37 so that they move together as a single unit. In the middle or neutral portion 13 of the total stroke, the assembly 20 and the assembly 30 move back and forth in a neutral position while the outlet means 25, 31 remains closed. Normally, if there is no leak, the device remains in its neutral position most of the time.

In the lowermost part of FIG. 2, the floating assembly 20 and the pin assembly 30 move against biasing means 37 and with biasing means 26 in the travel direction indicated for the microswitch opening portion 15 of the total stroke to open microswitch 17 which is connected to a solenoid which is connected to a source of high pressure fluid or to a pump, while the outlet means 25, 31 continues to remain closed. The high-pressure fluid then enters and pressurizes the entire system, and the pressure-control device 10 returns to its neutral position.

The pressure-control device 40 shown in FIG. 3 is a knob-regulated embodiment which has performed satisfactorily for regulating the pressure of a rotary-vane air compressor.

The device comprises a double-diaphragm separator assembly 70 as a pressure-relief member, a pin assembly 80, and a housing means comprising a spring case 41, an upper diaphragm support 47, a diaphragm spacer 48, and a lower diaphragm support 49. Upper diaphragm support 47 and diaphragm spacer 48 are sealably attached to a larger diaphragm 75, and diaphragm spacer 48 and lower diaphragm support 49 are sealably attached to a smaller diaphragm 76 so that the diaphragms 75, 76 form a pressure chamber 91 therebetween.

Separator assembly 70 comprises a diaphragm separator 71 having a threaded elongated end around which adjustable spring 45 is disposed within spring case 41. The spring is positioned by lockwasher 72, which is held by tightening nut 73 onto a buffer plate 74 which clamps larger diaphragm 75 onto the radially enlarged separating portion of separator 71. Another buffer plate 74, at the other end of separator 71, clamps smaller diaphragm 76 against the separating portion of separator 71. The other end of separator 71 is internally threaded, and a seat disc retainer 78 is threaded thereinto to hold the adjacent buffer plate 74 in place. A seat disc 79 is pressure fitted within the seat disc retainer 78. Separator 71 also has an inlet port 77 which is disposed within pressure chamber 91 and connected to an axially disposed passage 78' in seat disc retainer 78 and seat disc 79.

A straight inlet connector 52, having a connector nut 53, is threadably attached to lower diaphragm support 49 so that it provides connection to inlet passage 51 and to the system for inflow 55 when system pressure must be decreased. An elbow outlet connector 62, having connector nut 63 thereon, is threadably attached at the opposite side of lower diaphragm support 49 to provide connection with a relief chamber 93 between smaller diaphragm 76 and lower diaphragm support 49 and to allow passage of outflow 65 after the pressure-control device 40 has operated to decrease the system pressure.

A pin case 61 is threadably attached to lower diaphragm support 49 and provides a chamber having a high-pressure shoulder 67 and a low-pressure shoulder 68 which function as stop shoulders during movement of the pin assembly 80. The microswitch 57 is attached to switch retainer 66 which is an upstanding portion of pin case 61.

A pin assembly 80 comprises a pin 81, an adjusting screw 83 which is threadably inserted into the interior of pin 81, an annular lug having a high-pressure shoulder 87 and a low-pressure shoulder 88, and a valve spring 85 which is fitted around pin 81 and bears against low-pressure shoulder 88 at one end and against microswitch 57 at the other end.

By turning the knob of adjusting screw 43, upper spring support 46 is raised or lowered and the force exerted by diaphragm spring 45 is selectively varied. This force is opposed by the net force created by the unequal diaphragms 75, 76 and is also opposed by the spring force of valve spring 85 until high-pressure shoulder 87 contacts high-pressure surface 67 when the pressure in pressure chamber 91 is sufficiently excessive as compared to a selected pressure represented by the set point of the adjusting screw 43. When the pressure in chamber 91 is insufficient as compared to this selected pressure, the separator assembly 70 and the pin assembly 80, being clamped together by the opposing spring forces of springs 45 and 85, move downward as a body until microswitch 57 is contacted and activated. Excessive movement which might damage microswitch 57 is prevented, however, by contact of shoulder 88 against shoulder 68.

Figure 4:
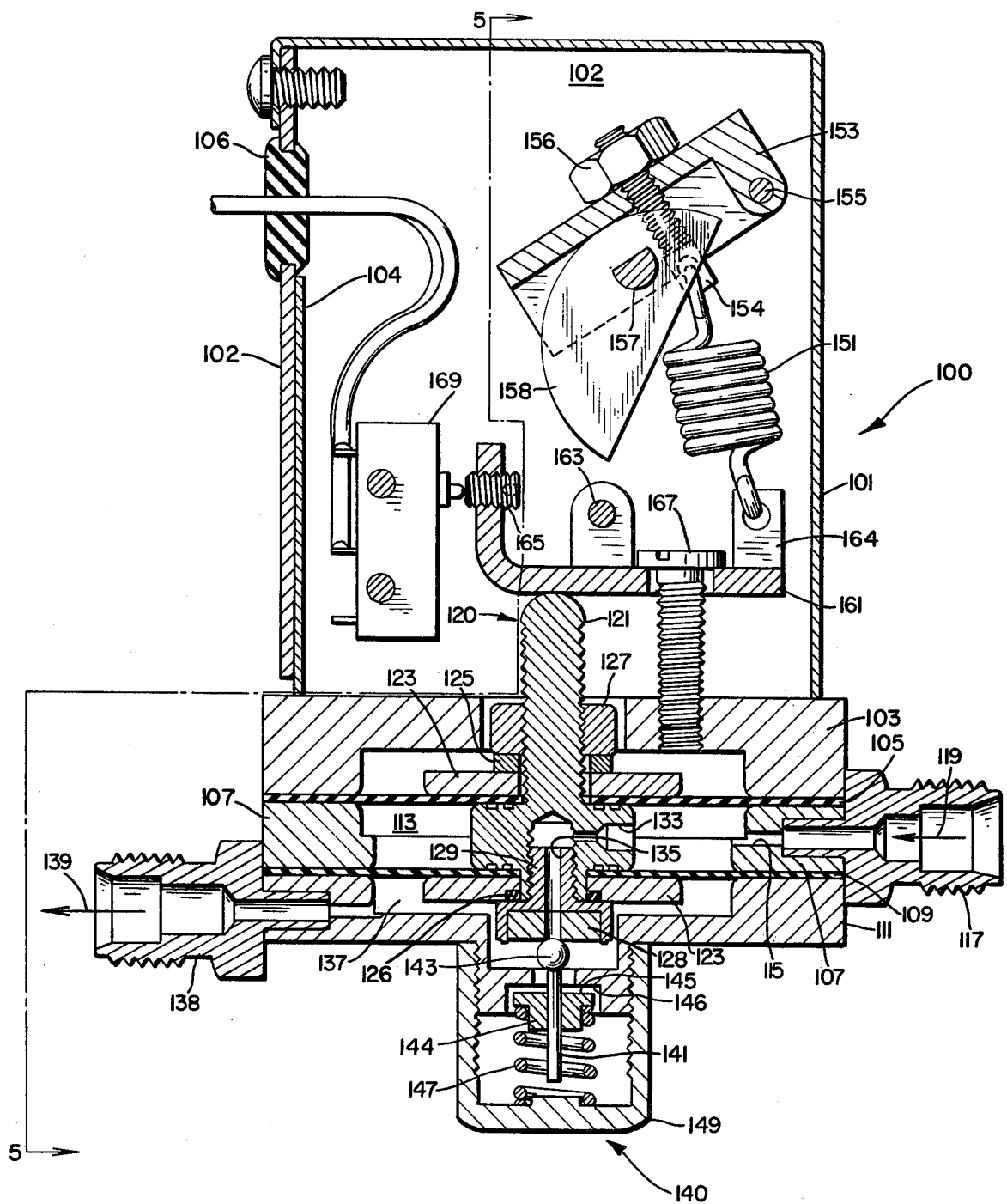
FIG. 4 is a sectional elevation of another and preferred embodiment which is suitable for lever adjustment for a system at a pressure higher than ambient, looking in the direction of the arrows 4—4 in FIG. 5.

The pressure control device 100 which is shown in FIG. 4 is a lever embodiment which is suitable for installation in an automobile and operation thereof by a lever mounted on its dashboard. It has an adjustable tension spring instead of the adjustable compression spring of the device 40, but it operates in essentially the same way and comprises essentially the same parts.

Figure 5:
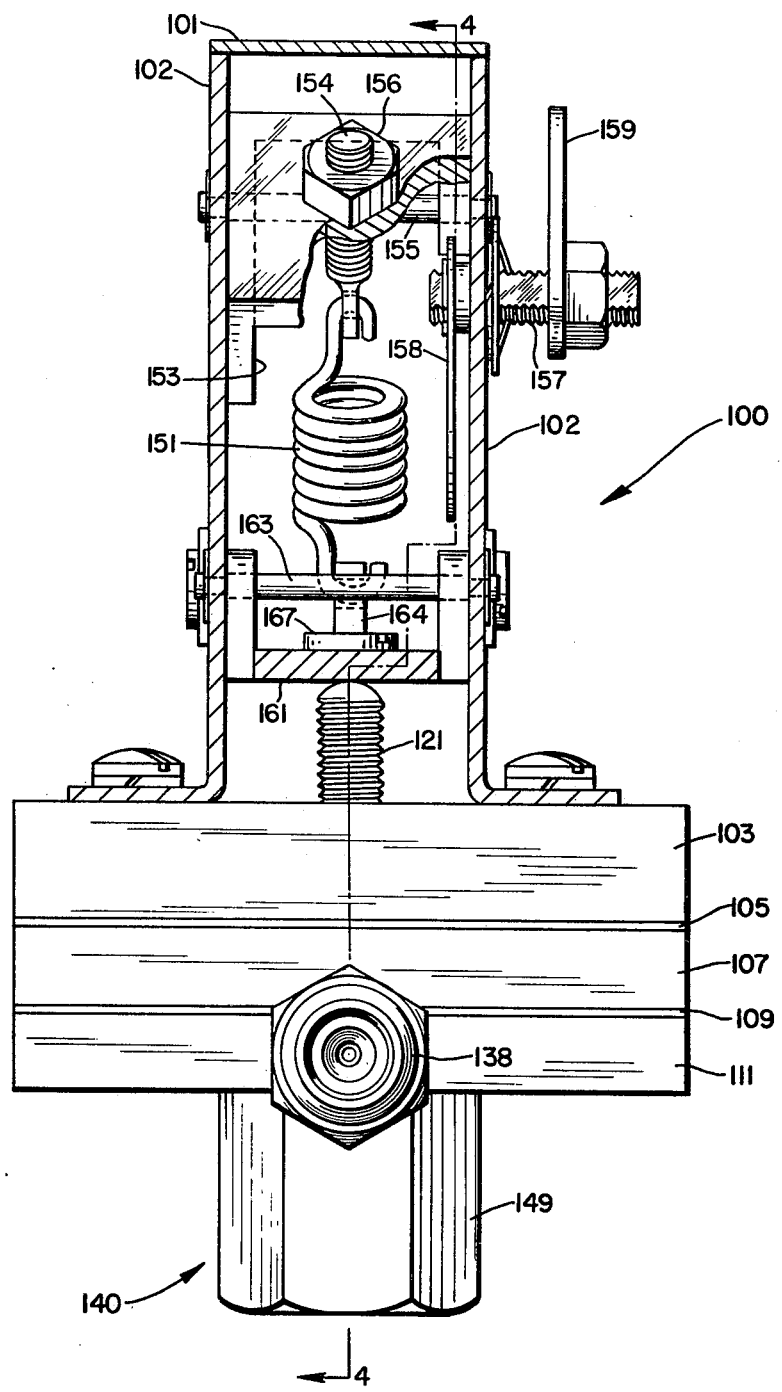
FIG. 5 is an elevation, partly in section, of the device of FIG. 4, looking in the direction of the arrows 5—5 in FIG. 4.
Figure 6:
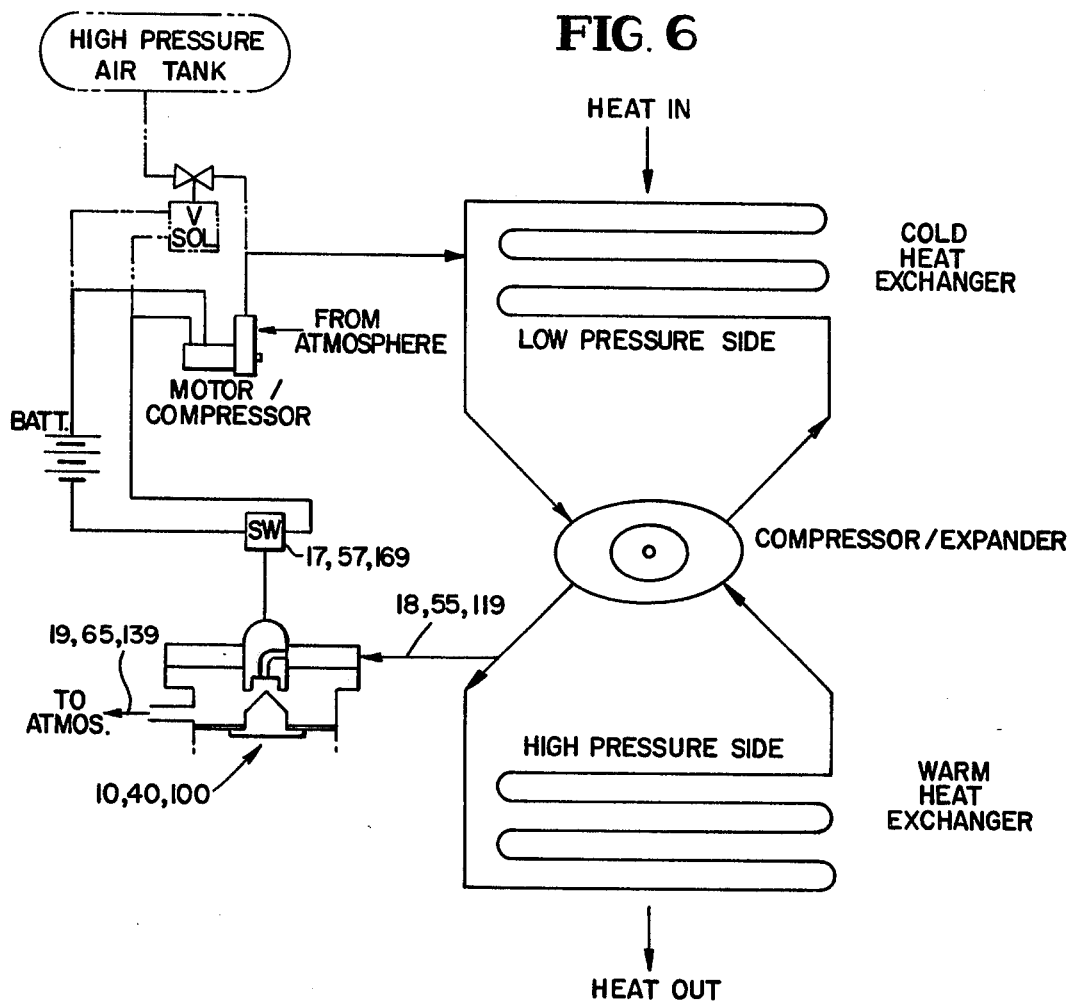
FIG. 6 is a schematic representation of an air conditioning system to which is connected the pressure-control device of this invention.
Figure 7:
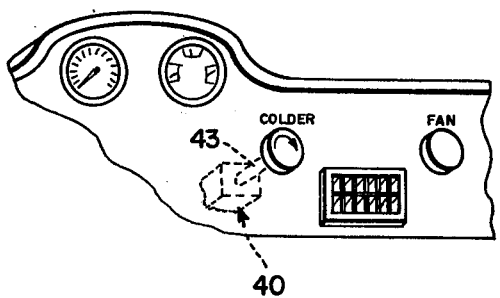
FIG. 7 is a perspective view of the panel of an automobile containing the air conditioning system of FIG. 6, on which is rotatably mounted a knob that controls the pressure-control device connected thereto, as seen in FIG. 3.
Figure 8:
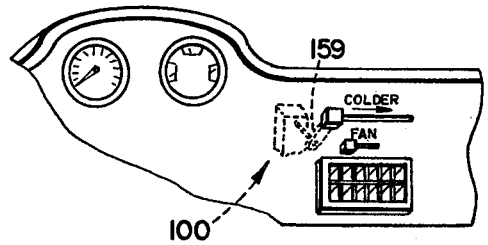
FIG. 8 is a perspective view of the panel of another automobile, also containing the air conditioning system of FIG. 6, on which is rotatably mounted a lever rotating a cam which selectively moves another lever about a pivot, as seen in FIGS. 4 and 5.

The lever embodiment 100 shown in FIGS. 4 and 5 comprises a case 102 and a case cover 101 which are attached to upper diaphragm support 103. Larger diaphragm 105 is sealably clamped between upper diaphragm support 103 and diaphragm spacer 107. Smaller diaphragm 109 is clamped between diaphragm spacer 107 and lower diaphragm support 111. A pressure chamber 113 is formed by the pair of diaphragms 105 and 109 and the diaphragm spacer 107. Inlet connector 117 is attached to diaphragm spacer 107 and is aligned with inlet passage 115 to provide fluid communication for the system being monitored and for inflow 119 therefrom to pressure chamber 113 when it is necessary for the pressure-control device 100 to decrease the system pressure.

Double-diaphragm separator assembly 120 comprises a diaphragm separator 121 having an axially elongated portion and a radially widened portion which separates the diaphragms 105 and 109 and against which these diaphragms are clamped by a pair of buffer plates 123. The upper buffer plate 123 is held in place by a lockwasher 125 and a tightening nut 127. The lower buffer plate 123 is held in place by a threadably attached seat disc retainer 129 into which a seat disc or valve seat 128 is fitted. An O-ring 126 prevents leakage from pressure chamber 113 into relief chamber 137 which is formed by smaller diaphragm 109 and lower diaphragm support 111.

Within the radially broadened portion of separator 121 between the pair of diaphragms 105, 109, an inlet port 133 is connected to a passage 135 within seat disc retainer 129 and valve seat 128, thus providing fluid communication from the system pressure to a valve port defined by the space between the circular edge of the passage in valve seat 128 and a ball 143, and thence to the relief chamber 137.

An outlet connector 138 is attached to the lower diaphragm support 111 and provides fluid communication from relief chamber 137 and for outflow 139 (corresponding to inflow 119) when the pressure-control device 100 is operating to reduce the system pressure to a selected pressure.

Pin assembly 140 comprises a pin 141, a ball 143, and a pin carrier 144, having a high-pressure shoulder 145 on one side thereof, and an elongated portion for seating valve spring 147. Pin 141 and ball 143 function as a valve when seating against and sealably closing valve seat 128. The high-pressure shoulder 145 contacts and is stopped by high-pressure surface 146 on lower diaphragm support 111. Valve spring 147 is a compression spring acting between pin 141 and a valve case 149 which is attached to lower diaphragm support 111, thereby sealably enclosing access passages to relief chamber 137.

In contrast to the knob embodiment 40, this pressure-control device 100 has its microswitch activating means within the same case 101, 102 as its adjustable spring 151. Specifically, adjustable tension spring 151 is attached with an adjusting bolt 154 and nut 156 to a positioning lever 153 which rotates according to movement of movable cam 158 so that the set point, representing a selected system pressure, is established. The cam 158 is attached to and is moved by a cam shaft 157 which passes through the side of case 102 and is selectively rotated by attached adjusting lever 159 which is suitably positioned on the dashboard of an automobile in which the pressure-control device 100 is mounted.

The other end of adjustable spring 151 is attached to a spring lug 164 at one end of a pressure lever 161 which pivots about lever shaft 163, and which is attached to case 102, and has an adjustably positioned set screw 165 which contacts microswitch 169 when the system pressure is at or below the selected pressure, as shown in FIGS. 1b and 1c. When the system pressure increases sufficiently that the net diaphragm force overcomes the adjustable spring force, as shown in FIG. 1a and in the upper portion of FIG. 2, separator 121 rises against lever 161, causing set screw 165 to move away from microswitch 169 while the bleed port opens between valve seat 128 and ball 143 when movement of shoulder 145 is stopped by surface 146.

Pressure lever 161 bears against the top end of the elongated portion of diaphragm separator 121 at all times. In order to prevent damage to microswitch 169, a bolt 167 is attached to upper diaphragm support 103 through a hole in pressure lever 161 and is adjustably positioned to prevent set screw 165 from exerting excessive pressure on microswitch 169.

By measuring the high-pressure side of a compressor, particularly when the compression ratio is about 3:1, the pressure-control device of this invention obtains much finer control of the pressure within a system. The adjustable springs and the valve springs can be varied from low-gradient to high-gradient characteristics. Similarly, the diaphragms can be varied in gradient; preferably, diaphragms are of rubber which is a low-gradient material, but they can be constructed of metal having high-gradient characteristics.

The valve spring 85 of the pressure-control device 40 is adjustable at the point of manufacture by movement of adjusting screw 83 to compensate for tolerances which are built into the microswitch 57 and the pin case 61. There is no further need thereafter for movement of the adjusting screw 83.

The separators 21, 71, 121 are readily molded from a plastic material and provided with a pair of circumannular slots into which the pair of rubber diaphragms 27, 29, 75, 76, 105, 109 can be inserted by stretching into place. The diaphragms can then be sealed in the slots by crimping or by use of adhesives so that the diaphragm fastening means 123, 125, 127 are not necessary.

The pressure-control device of this invention is suitable for use with any fluid, whether gas or liquid, provided that the materials of construction resist corrosion and other damage caused by the fluid.

The pressure-control device of this invention is useful over a very wide range of pressures, depending upon the materials of construction that are selected and the design of components as to strength requirements. Its concept of minimizing the gradients required for adjustable springs 45, 151 by balancing the spring force with the net diaphragm or pressure force produced by a pair of unevenly matched diaphragms enables pressure set points to be established with precision. Because the gradients of the adjustable springs can thereby be selected without regard to the system pressure, the response characteristics can also be selected as functions of time and amplitude.

Because it will be readily apparent to those skilled in the art that innumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

What is claimed is:

1. A pressure-control device, which is connected in parallel to a system containing a fluid, for maintaining said fluid at a selected pressure, comprising:
    A. a double-diaphragm assembly, comprising:
        (1) a pair of diaphragms which are disposed in parallel and have unequal areas exposed to said selected pressure to form a larger diaphragm and a smaller diaphragm, the difference between said unequal areas creating a net force,
        (2) a diaphragm separator to which said diaphragms are sealably attached and within which is a passage connecting a first port disposed between said diaphragms and a valve seat disposed outside of said diaphragms, said first port being connected to said system;
    B. a valve which fits sealably into said valve seat;
    C. a biasing means for compressing said valve against said valve seat, whereby said pair of diaphragms, said separator, and said valve travel together, transversely to said diaphragms, in a first travel direction and in a second travel direction, said biasing means having a first component opposing said net force and a second component assisting said net force; and
    D. a travel interruption means which contacts and stops said travel of said valve moving in said first travel direction, whereby a second port is formed between said valve and said valve seat when said separator continues said travel in said first travel direction, so that said system is connected to said ambient pressure.

2. The pressure-control device of claim 1 which further comprises a switch means for connecting said system to a source of said fluid at a higher pressure than said selected pressure.

3. The pressure-control device of claim 2, wherein said separator and said valve travel together in said second travel direction to activate said switch means.

4. The pressure-control device of claim 3, wherein said second component is an adjustable compression spring which is attached to said separator.

5. The pressure-control device of claim 3, wherein said first component is a tension spring which is attached to a lever pressing against said separator and activating said switch means.

6. The pressure-control device of claim 5, wherein said tension spring is adjustable for establishing said selected pressure.

7. The pressure-control device of claim 6, wherein said second component is a compression spring which is attached to said valve.

8. The pressure-control device of claim 7, wherein said travel interruption means comprises a pin shoulder attached to said valve and a stop shoulder attached to a housing to which said pair of diaphragms are sealably attached.

9. The pressure-control device of claim 8, wherein said housing forms a pressure chamber with and between said pair of diaphragms, said pressure chamber being at the pressure within said system.

10. A pressure-control device for maintaining a selected pressure for a fluid within a system, comprising:
   A. a housing having a passage which is connected to said system;
   B. a double-diaphragm assembly which is disposed within said housing, comprising:
      (1) a pair of diaphragms which are:
         (a) spaced apart to form parallel sides of a pressure chamber, and
         (b) sealably attached to said housing so that one of said pair of diaphragms is a larger diaphragm, with respect to area exposed to ambient pressure, than the other diaphragm,
      (2) a diaphragm separator on which said pair of diaphragms are sealably mounted in parallel, comprising:
         (a) a first port which is disposed between said pair of diaphragms and within said pressure chamber,
         (b) a valve seat which is disposed outside of said pressure chamber, and
         (c) an internal passageway connecting said first port to said valve seat, and
      (3) a first biasing means for exerting a biasing pressure transversely to said pair of diaphragms and oppositely to the resultant net force exerted by said pair of diaphragms;
   C. a pin assembly which comprises:
      (1) a valve which fits sealably within said valve seat, and
      (2) a second biasing means for exerting a sealing pressure to move said valve toward said valve seat; and
   D. a stop means for preventing travel, caused by said resultant net force plus said sealing pressure being greater than said biasing pressure, beyond a selected position of said pin assembly in said transverse direction, whereby said valve seat and said valve are selectively separated and a second port is formed.

11. The pressure-control device of claim 10, wherein said selected pressure is greater than ambient, whereby said first port is the inlet port and said second port is the outlet port.

12. The pressure-control device of claim 11, wherein said first biasing means is a compression spring acting between said housing and said separator to move said separator toward said pin assembly.

13. The pressure-control device of claim 12, whereby said pin assembly moves oppositely to said resultant force to activate a pressure-increasing means for admitting an additional quantity of said fluid to said system.

14. The pressure-control device of claim 13, wherein said pressure-increasing means comprises a microswitch which is connected to a pump to increase the pressure of said fluid within said system.

15. The pressure-control device of claim 14, wherein said microswitch is attached to a portion of said housing which provides a chamber within which are disposed a high-pressure shoulder and a high-pressure surface which cooperatively function as said stop means.

16. The pressure-control device of claim 13, wherein said pressure-increasing means comprises a solenoid which is connected to a source of said fluid at an elevated pressure.

17. The pressure-control device of claim 13, wherein said pair of diaphragms and said springs are selectively varied in gradient.

18. The pressure-control device of claim 15, wherein said fluid is air and said system is an air-conditioning system.

19. The pressure-control device of claim 18, wherein said compression spring is attached to a threaded rod which is threadably attached to said housing, whereby said biasing pressure is selected by selectively rotating said threaded rod.

20. The pressure-control device of claim 19 wherein said threaded rod is attached to a knob which is rotatably attached to the panel of an automobile in which said air-conditioning system is disposed.

21. The pressure-control device of claim 11, wherein said first biasing means is a tension spring which pulls a first lever into compressive contact with said separator.

22. The pressure-control device of claim 21, wherein said first lever activates a pressure-increasing means for admitting an additional quantity of said fluid to said system.

23. The pressure-control device of claim 22, wherein said pressure-increasing means comprises a microswitch which is connected to a pump to increase the pressure of said fluid within said system.

24. The pressure-control device of claim 23, wherein said system comprises a compressor for said fluid which maintains said fluid within a high-pressure side and a low-pressure side at a compression ratio of about 3:1 and wherein said pressure-control device measures said high-pressure side.

25. The pressure-control device of claim 24, wherein said fluid is air and said system is an air-conditioning system.

26. The pressure-control device of claim 25 wherein said tension spring is attached to a second lever which is selectively moved about a pivot by a cam which is rotated by a third lever which is mounted on the panel of an automobile in which said air-conditioning system is disposed 27. The pressure-control device of claim 11 wherein said double-diaphragm assembly decreases the working loads required for said first biasing means and said second biasing means in proportion to the difference in areas between said pair of diaphragms.

28. The pressure-control device of claim 27 wherein said difference in areas is 0.1 to 0.2.

29. The pressure-control device of claim 27 wherein each said biasing means is a spring having a gradient determined by said working load therefor and the stroke made available by said travel.

* * * * *